United States Patent [19]

Hamlet

[11] 3,815,048

[45] June 4, 1974

[54] LC-OSCILLATOR WITH AUTOMATIC STABILIZED AMPLITUDE VIA BIAS CURRENT CONTROL

[75] Inventor: John F. Hamlet, Huntsville, Ala.

[73] Assignee: The United States of America as represented by the Administrator of the National Aeronautics and Space Administration, Washington, D.C.

[22] Filed: June 15, 1973

[21] Appl. No.: 370,505

[52] U.S. Cl. .............. 331/109, 331/117 R, 331/183

[51] Int. Cl. .............................................. H03b 3/02

[58] Field of Search ................ 331/109, 117 R, 183

[56] References Cited

UNITED STATES PATENTS

| | | | |
|---|---|---|---|
| 3,134,947 | 5/1964 | Charasz | 331/109 |
| 3,213,390 | 10/1965 | Faith et al. | 331/109 |
| 3,649,929 | 3/1972 | Thompson | 331/109 X |

*Primary Examiner*—Herman Karl Saalbach
*Assistant Examiner*—Siegfried H. Grimm
*Attorney, Agent, or Firm*—L. D. Wofford, Jr.; G. J. Porter; J. R. Manning

[57] ABSTRACT

A stable excitation supply for transducers having a single-transistor oscillator with a coil connected to the collector and a capacitor connected from the collector to the emitter. The base is connected through a resistor to ground. The output of the oscillator transistor is connected to a buffer circuit of two transistors of opposite conductivity type. That output is connected to a standard rectifier and then as one input to a differential amplifier. The output of the differential amplifier is connected to a resistor which is connected between the emitter of the oscillator transistor and ground.

6 Claims, 5 Drawing Figures

LC-OSCILLATOR WITH AUTOMATIC STABILIZED AMPLITUDE VIA BIAS CURRENT CONTROL

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to circuit design for the generation of oscillations with stability of amplitude as well as frequency of the signals generated, which is useful as a power excitation supply to transducers and for diverse other purposes.

A stable excitation supply for transducers provides controlled inputs for use in excitation of capacitance and inductance transducers used for measuring such parameters as pressure, vacuum, liquid level, displacement, fluid flow, and fluid density. Such stable supplies are required when the transducers are not incorporated into a null balance readout system.

Previous methods to stabilize the AC supplies have included regulation of the DC power supply to the oscillator or an external automatic gain control (AGC) circuit controlling the oscillator, typically employing devices such as incandescent lamps or field effect transistors. Disadvantages of these techniques are that regulation of DC power requires excessive numbers of additional circuit parts and the tuning out of distortion; that AGC by incandescent lamps provides limited dynamic range and is temperature sensitive; and that AGC by field effect transistor has inherent distortion.

The advantages of this invention over previous designs are that it provides amplitude regulation with low distortion. Stability is accomplished by changing the bias on the oscillator transistor instead of with control devices. In an optional feature, amplitude can be selected over a large range.

U.S. Pat. No. 3,134,947 to J. G. Charasz describes a method of stabilizing the amplitude of a multi-transistor oscillator by controlling the bias on one transistor. This invention is different in that it comprises a method to control the amplitude of a single-transistor oscillator, thereby minimizing the complexity of the basic oscillator. The patent in its present form also requires a crystal to control frequency. Also, the patent design is not suited for use as a measurement transducer source.

U.S. Pat. No. 3,213,390 to W. O. Faith et al describes a method of the kind indicated above to control oscillator amplitude by controlling the DC voltage supply to the oscillator. The instant invention differs in that the amplitude is controlled by controlling only the bias of the oscillator.

U.S. Pat. No. 3,278,860 to R. Winn, U.S. Pat. No. 3,369,193 to J. G. Nordahl, U.S. Pat. No. 3,378,791 to W. T. Towner, and U.S. Pat. No. 3,388,345 to W. T. Towner describe methods to control oscillator amplitude via external AGC control using a diode circuit external to the oscillator. The instant invention differs in that it does not require an external element, but utilizes the oscillator transistor only and controls amplitude by controlling the bias on that transistor.

U.S. Pat. No. 3,443,245 to V. Whittaker and U.S. Pat. No. 3,480,880 to D. A. Starr, Jr. describe methods of controlling oscillator amplitude by use of a transistor in addition to that required for the basic oscillator. The instant invention does not require this external element and controls the oscillator amplitude by controlling the bias on the oscillator transistor.

SUMMARY OF THE INVENTION

It is a primary object of this invention to provide a practical and useful oscillation supply having good stability.

It is a related object of this invention to provide an oscillation supply having low distortion.

It is, similarly, an object of this invention to provide such an oscillation supply for use with measurement transducers.

It is a related object of this invention to provide a stable oscillation supply the output amplitude of which may be changed by the simple change of an input signal.

In accordance with this invention a first transistor is connected in a feedback with a tuned RC circuit to form an oscillator. The output of the oscillator is rectified, which may be accomplished in a conventional circuit. The rectified signal is connected as one input to a differential amplifier, the other input of which is a reference potential. The output of the differential amplifier is connected at a point between the emitter of the transistor and ground. When the rectified signal is greater than the reference signal, the differential amplifier produces a signal of polarity to reduce bias current (and, consequently, amplification) in the first transistor. In one embodiment various reference voltage levels may be supplied by connection to different inputs to vary the amplitude level at which the oscillator is stabilized.

Other objects, features, advantages, and characteristics of the invention will be apparent from the following description of preferred embodiments, as illustrated from the accompanying drawings.

DESCRIPTION OF THE PREFERRED EMBODIMENTS

Figure 1:
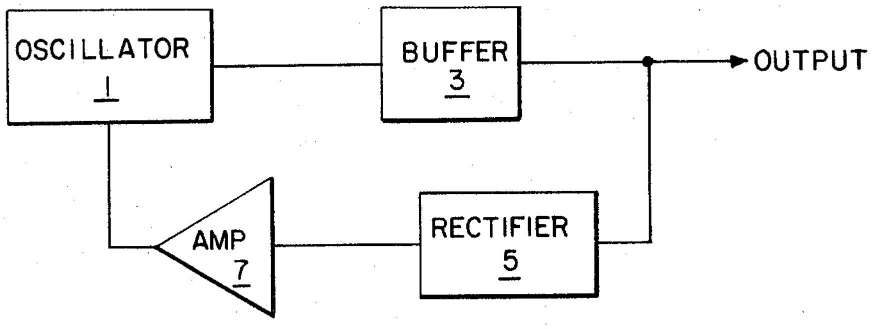
FIG. 1 is a block diagram indicating the major elements of the preferred circuit.

As shown in FIG. 1, the preferred embodiment comprises an oscillator 1, the output of which drives a buffer 3. The output of buffer 3 drives the load, which may be a conventional measurement transducer. The buffer 3 is essentially a conventional feature which holds the center line of the oscillations to the zero level.

The output of buffer 3 is also fed back through rectifier 5, then through a differential amplifier system 7 to the oscillator 1. The output of amplifier system 7, when the rectified signal is larger than a preselected reference signal, reduces the bias in the active element of oscillator 1, as is discussed in detail in connection with FIG. 2.

Figure 2:
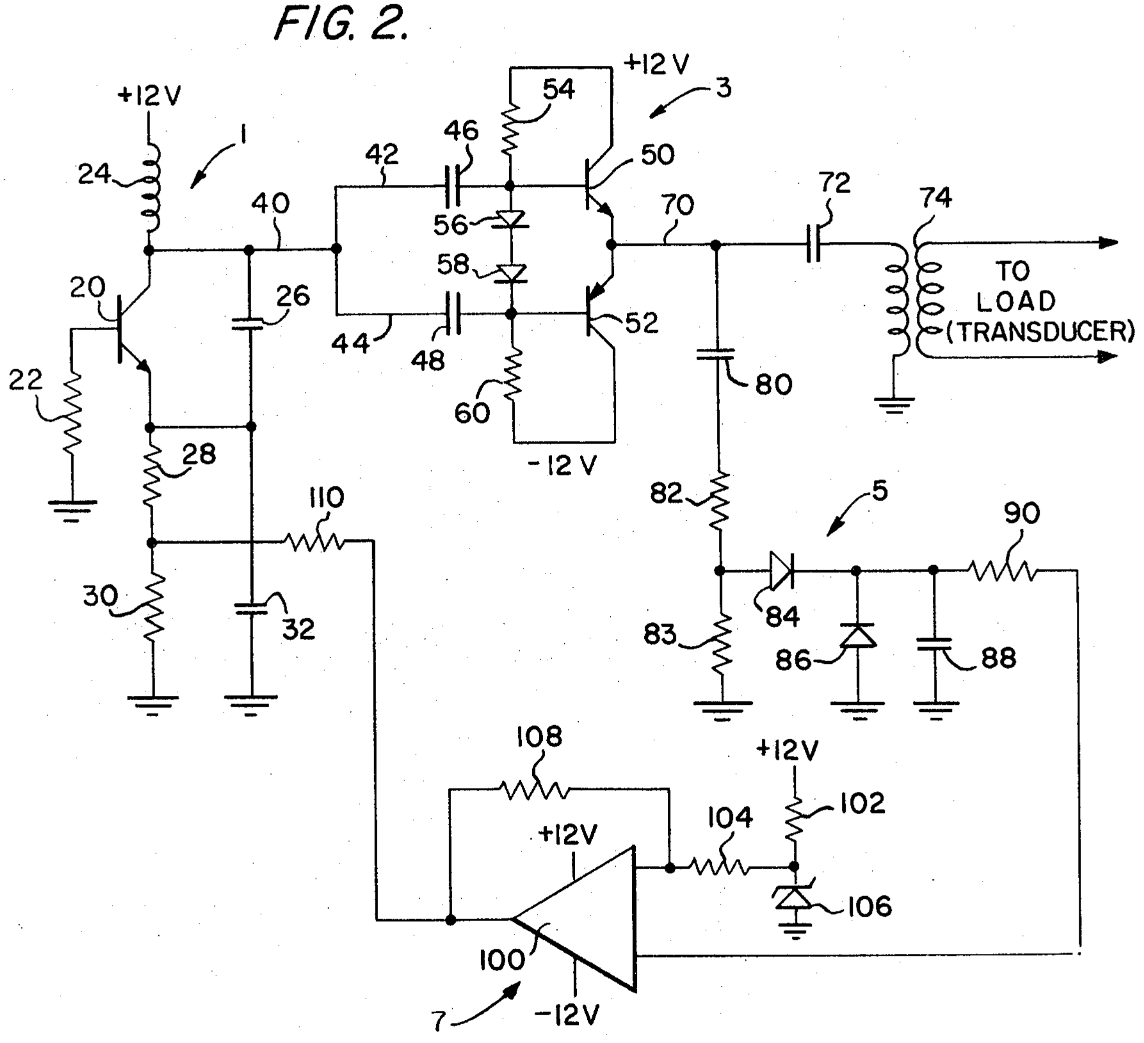
FIG. 2 is a circuit diagram of the preferred circuit.

FIG. 2 is a circuit diagram of the system shown generally in FIG. 1. The oscillator 1 is seen to be comprised of a conventional transistor 20 having an emitter, a base, and a collector. The base of transistor 20 is connected through a 10K ohm resistor 22 to ground. The collector of transistor 20 is connected through a coil 24 to a +12 volt source of reference potential. A capacitor 26 is connected directly across the collector and emitter of transistor 20.

Coil 24 and capacitor 26 form a tuned circuit at the preselected frequency of oscillations, and the feedback through capacitor 24 to the input of transistor 20 is sufficient to sustain oscillations.

The emitter of transistor 20 is connected to ground through a series connection of 10K ohm resistor 28 and 2.7K ohm resistor 30. A relatively large (0.33$\mu$f.) capacitor 32 is connected between the emitter of transistor 20 and ground to provide appropriate impedance across which the feedback voltage is developed.

The output of oscillator 1 is connected on line 40 to the buffer 3, which comprises two, parallel lines 42 and 44, each with a capacitor 46 and 48 to block DC components. Transistors 50 and 52 are of opposite conductivity types, thereby forming a complementary circuit. The emitter of transistor 50 is connected directly to the emitter of transistor 52, while the base of transistor 50 is connected to capacitor 46. Similarly, the base of transistor 52 is connected to capacitor 48.

The collector of transistor 50 is connected to a +12 volt reference source and the collector of transistor 52 is connected to a −12 volt reference source. The collector of transistor 50 is connected through a large resistor 54 (47K ohm) to the base of transistor 50, and that point is connected to the base of transistor 52 through diodes 56 and 58, which are in series and poled to conduct current driven by the +12 volt source. The base of transistor 52 is connected through a large resistor 60 (51K ohm) to the −12 volt reference source. The circuit comprising resistors 54 and 60 serves to bias the transistors 50 and 52 at the desired operating point.

The structure and operation of this buffer circuit are essentially conventional, with each transistor 50 and 52 conducting on alternate half cycles of the output signal from oscillator 1.

The output of buffer 3 appears on line 70 at the junction of transistors 50 and 52. In the preferred application, that is connected through capacitor 72, which blocks DC components, to a transformer 74. The output of the transformer 74 drives a transducer (not shown) used for measuring, in particular, a capacitive transducer used in a liquid level probe.

The output of buffer 3 is also connected through capacitor 80, which blocks DC components, through 10K ohm resistor 82 to the junction of 17K ohm resistor 83 and diode 84. The other end of resistor 83 is connected to ground. The side of diode 84 away from resistor 83 is connected to diode 86, which is connected to ground and poled to reject current which diode 84 is poled to pass. A 0.1$\mu$f. capacitor 88 is connected to ground in parallel with diode 86. A 1K ohm resistor 90 is connected between diode 84 and the input of differential amplifier 100.

The rectifier circuit is essentially conventional, in which signals of one polarity are passed by diode 84 and amplitude smoothed by the interaction of capacitor 88 and resistor 90.

Differential amplifier 100 is a conventional and well known circuit, and is not shown in detail. A +12 volt source of potential is connected at one input through a 460 ohm resistor 102, which is connected through 1K ohm resistor 104 to the amplifier and to ground across diode 106. Zener diode 106 is poled to block signals driven by the +12 volt source. Resistor 108, which is connected across the input terminal of amplifier 100 connected to resistor 104 and the output of amplifier 100, is of relatively very large magnitude (100K ohms). Accordingly, substantially the same +12 volts as is applied from the reference source appears as the reference input to amplifier 100. The output of amplifier 100 is connected through 400 ohm resistor 110 to the junction of resistors 28 and 30.

In operation, when the signal from resistor 90 in rectifier 5 is greater than the reference signal applied to differential amplifier 100 through resistor 104, the signal at the output of amplifier 100 opposes the bias current in transistor 20 and thereby reduces the bias. Reduction of the bias reduces the amplification by transistor 20, and the amplitude of the output signal decreases. Conversely, when the rectified signal is less than the reference signal to amplifier 100, the output of amplifier 100 increases bias current in transistor 20 and the output amplitude of oscillations increases.

The preferred device has demonstrated stability of both voltage and frequency to 1 percent in tests between +70°C and −20°C.

MODIFIED EMBODIMENTS

Figure 3:
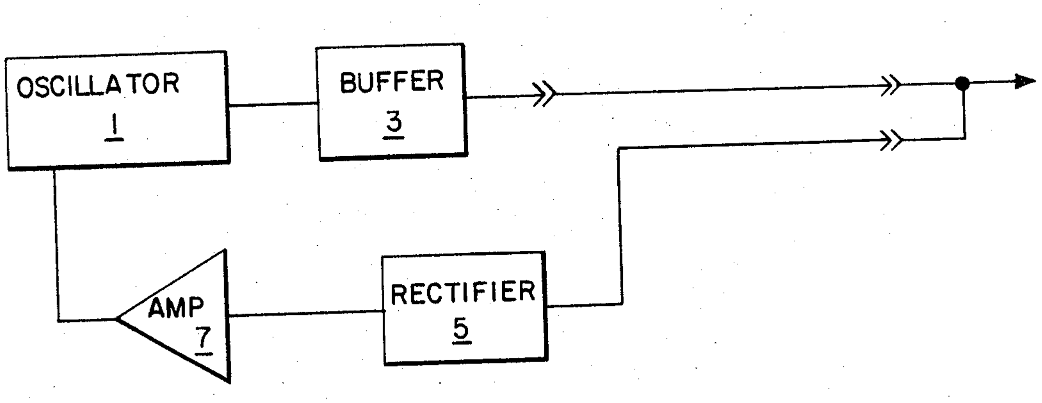
FIG. 3 is a block diagram showing the preferred system connected by cable to a remote output.

A remote system, whereby loading is eliminated by use of long cables, is shown in FIG. 3.

Figure 4:
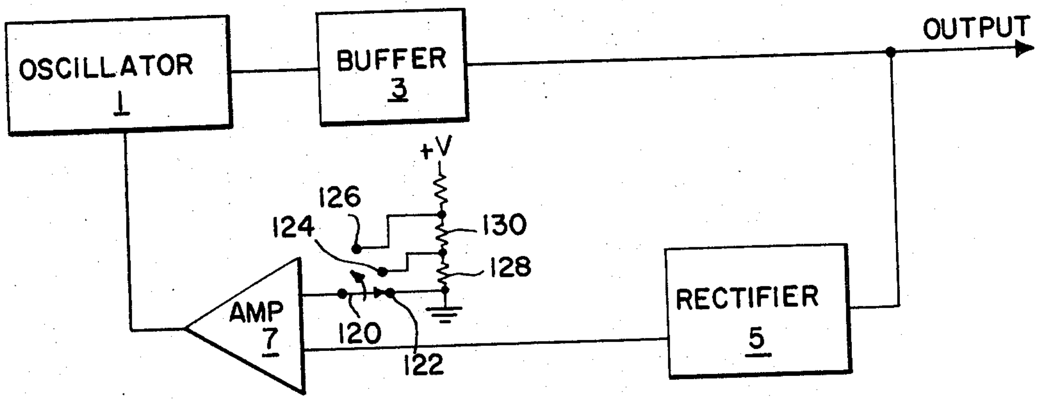
FIG. 4 is a block diagram showing illustratively a feature in which various reference voltages may be employed in the basic system.

An illustrative circuit to provide various reference voltages is shown in FIG. 4. Thus, by simply moving the switch 120 between the terminals 122, 124, and 126, which are electrically separated from a reference voltage +V by resistors 128 and 130, preselected, different voltages may be applied as the reference signal to amplifier 100. The level of amplitude of the oscillator 1 is then stabilized around the selected reference voltage automatically in the manner described in connection with FIG. 2.

Figure 5:
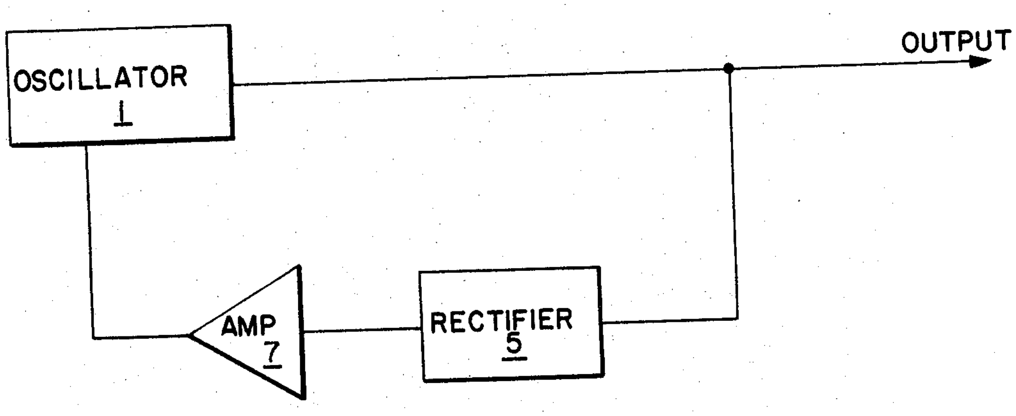
FIG. 5 is a block diagram of the invention without the buffer, which is not an essential element.

FIG. 5 illustrates the basic circuit without the buffer 3, since that is not an essential element. Such a circuit is suggested for applications requiring only light loads.

Other variations of the invention described will be apparent, and variations may well be developed which employ more than ordinary skill in this art, but nevertheless employ the basic contribution and elements of this invention. Accordingly, patent protection should not be essentially limited by the preferred embodiment disclosed, but should be as provided by law, with particular reference to the accompanying claims.

What is claimed is:

1. A stabilized oscillator circuit comprising a first transistor having an emitter, a base, and a collector; a capacitor and an inductor connected in a tuned circuit between said collector and said emitter; a first resistor connected from said base to ground; a rectifying circuit having its input connected to receive signals from said collector; a differential amplifier having one of its inputs connected to the output of said rectifying circuit; a source of reference potential connected to the other input of said differential amplifier; a second resistor having one terminal connected to the junction of said emitter and said tuned circuit and the other terminal connected to one terminal of a third resistor, the other terminal of said third resistor being connected to ground; a fourth resistor having one terminal connected to the junction of said second and third resistors, the output of said differential amplifier being connected to the other terminal of said fourth resistor.

2. The oscillator as in claim 1 in which said inductor is connected from said collector to a source of reference potential and said capacitor is connected between said emitter and the junction of said inductor and said collector.

3. The oscillator as in claim 2 also comprising a second transistor and a third transistor, each having an emitter, a base, and a collector and being of opposite conductivity type, connected emitter-to-emitter, with bases connected in parallel to said collector of said first transistor, the collector of said second transistor being connected to one source of reference potential and the collector of said third transistor being connected to a second source of reference potential to form a buffer circuit, the junction of the emitters of said second and third transistors being connected to the input of said rectifier circuit.

4. The circuit as in claim 1 in which said other terminal of said differential amplifier is adapted to be selectively connected to different reference potentials.

5. The circuit as in claim 2 in which said other terminal of said differential amplifier is adapted to be selectively connected to different reference potentials.

6. The circuit as in claim 3 in which said other terminal of said differential amplifier is adapted to be selectively connected to different reference potentials.

* * * * *